May 8, 1956   J. VERDERBER   2,744,500
FLUID OPERATED CLAMPING DEVICE WITH MECHANICAL ADVANTAGE
Filed Aug. 2, 1952   6 Sheets-Sheet 1

INVENTOR.
BY JOSEPH VERDERBER

ATTORNEYS

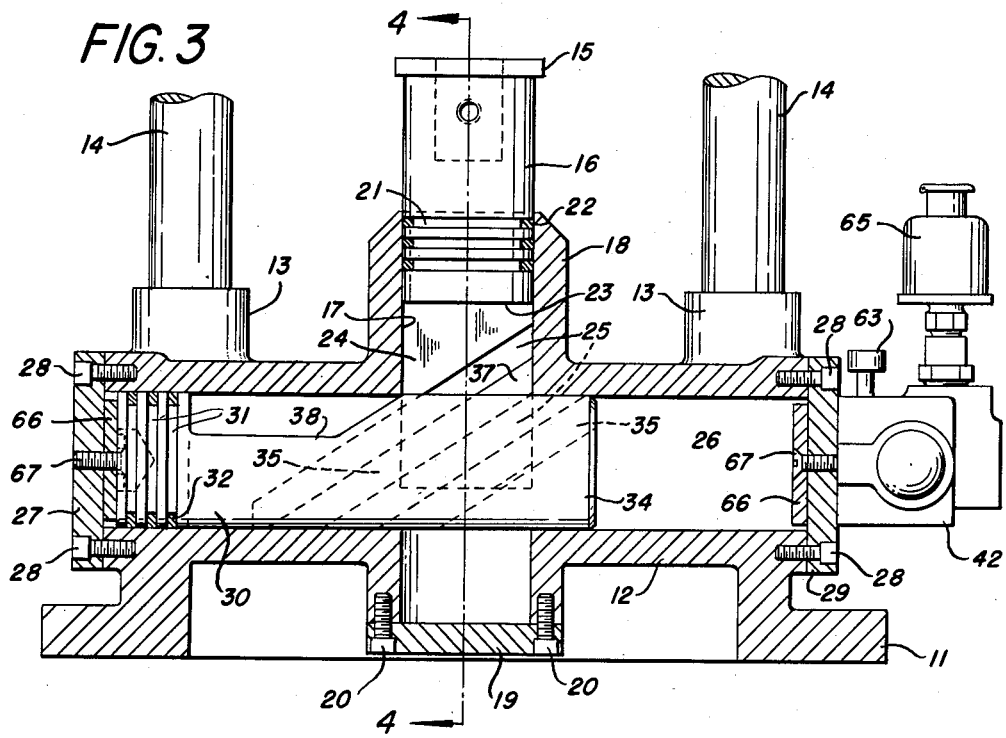

May 8, 1956  J. VERDERBER  2,744,500

FLUID OPERATED CLAMPING DEVICE WITH MECHANICAL ADVANTAGE

Filed Aug. 2, 1952  6 Sheets-Sheet 3

INVENTOR.
JOSEPH VERDERBER
BY
*Edward Ornstein*
ATTORNEYS

May 8, 1956 J. VERDERBER 2,744,500
FLUID OPERATED CLAMPING DEVICE WITH MECHANICAL ADVANTAGE
Filed Aug. 2, 1952 6 Sheets-Sheet 4

INVENTOR.
JOSEPH VERDERBER
BY
*Isler and Ornstein*
ATTORNEYS

May 8, 1956  J. VERDERBER  2,744,500
FLUID OPERATED CLAMPING DEVICE WITH MECHANICAL ADVANTAGE
Filed Aug. 2, 1952  6 Sheets-Sheet 5

INVENTOR.
JOSEPH VERDERBER
BY
ATTORNEYS

May 8, 1956   J. VERDERBER   2,744,500
FLUID OPERATED CLAMPING DEVICE WITH MECHANICAL ADVANTAGE
Filed Aug. 2, 1952   6 Sheets-Sheet 6

INVENTOR.
JOSEPH VERDERBER
BY
ATTORNEYS

United States Patent Office 2,744,500
Patented May 8, 1956

2,744,500

FLUID OPERATED CLAMPING DEVICE WITH MECHANICAL ADVANTAGE

Joseph Verderber, Cleveland, Ohio

Application August 2, 1952, Serial No. 302,331

4 Claims. (Cl. 121—38)

The present invention relates to clamping devices and more particularly to a fluid operated clamping device such as is used for holding work pieces during machining operations.

This application is a continuation-in-part of my copending application Serial No. 284,667, filed April 26, 1952, entitled "Pneumatic Clamping Device With Mechanical Advantage."

The invention contemplates a quick-acting clamping device which, in addition to utilizing a compressed fluid, such as air, as an actuating medium, also employs a mechanical advantage. By employing a positive mechanical interengagement between the fluid actuated piston and the clamping member, it is unnecessary to provide a pneumatic retracting circuit solely for the clamping member, such as was disclosed in the aforementioned copending application.

Additional objects and advantages of my invention will be apparent during the course of the following description and by reference to the accompanying drawings, forming a part of this specification, in which like numerals are employed to designate like parts throughout the same.

Fig. 3 is a vertical cross-sectional view taken on line 3—3 of Fig. 1 and showing the elevating mechanism of the device;

Fig. 4 is a vertical cross-sectional view taken on line 4—4 of Fig. 3;

Fig. 5 is a view similar to Fig. 4, but showing the clamping bar in retracted position;

Referring more particularly to Figs. 1–7 of the drawings, the clamping device is seen to comprise a heavy cast iron base 11 having integral therewith a cylinder block or body 12 of generally square contour.

Figure 1:
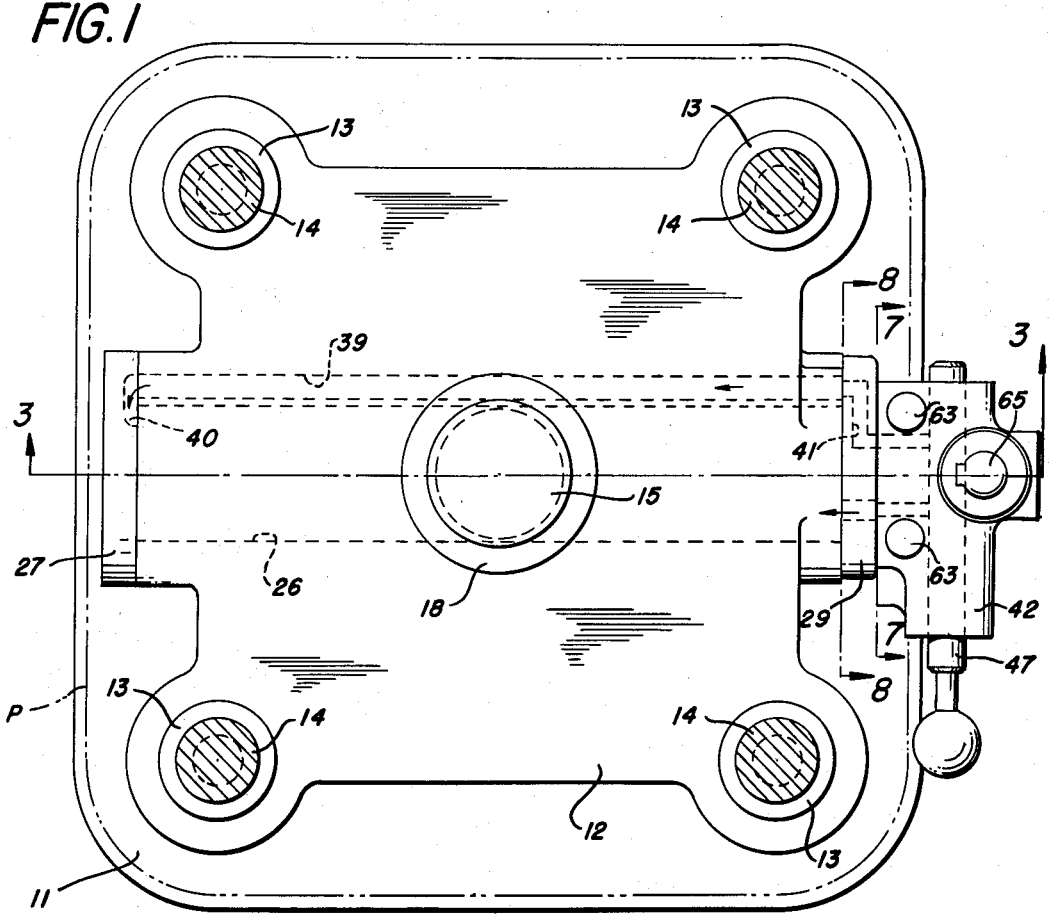
Fig. 1 is a top plan view of a clamping device embodying the features of my invention.
Figure 2:
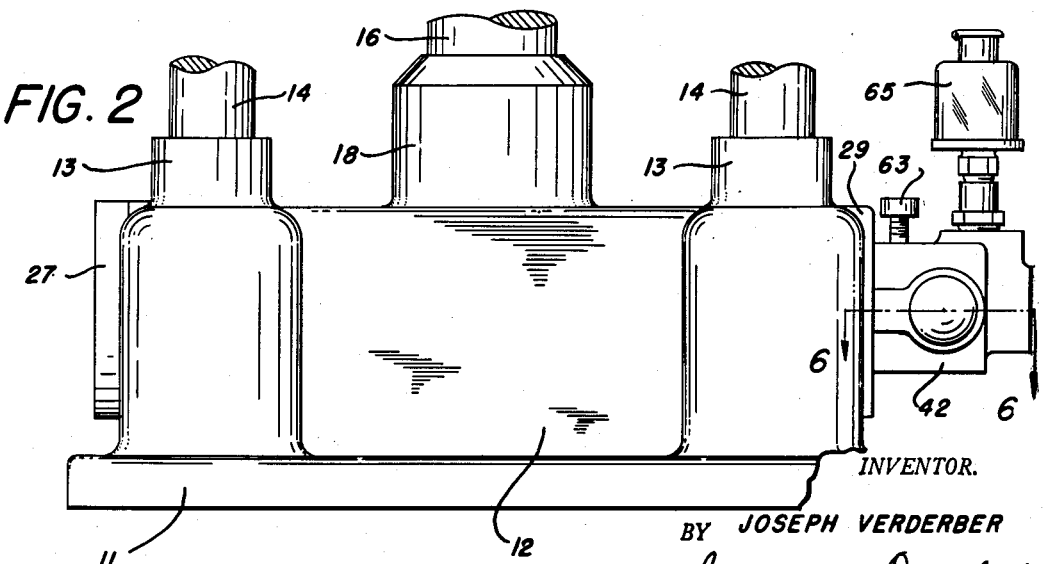
Fig. 2 is a front elevation of the same.

The four corners of the block 12 are provided with cylindrical embossments 13 in which are secured heavy studs 14 which serve to support a top-plate P, shown in dotted outline in Fig. 1.

Located centrally of the body 12 is a clamping block 15, which is integrated wtih a cylindrical clamping bar 16. The bar 16 is slidably received in a vertical bore 17 which extends through an embossment 18 on the body 12 into the body itself, and is closed at its lower end by a cap 19 which is secured to the body 12 by means of cap screws 20. The bar 16 is provided with a plurality of circumferential recesses 21 which serve to retain rings 22 which have wiping engagement with the wall of bore 17.

The lower portion of bar 16 is recessed, as at 23, to provide an extension 24 which is substantially semi-cylindrical in form and which is provided with a plurality of parallel angularly disposed recesses or grooves 25. The angularity of the grooves may be on the order of 30° to the diametrical plane of the bar 16.

The portion 24 of the clamping bar 16 projects into a horizontal cavity or bore 26, which intersects the bore 17 at right angles thereto and extends completely through the body 12. One end of the bore 26 is closed by a cap 27 which is secured to the body by means of screws 28. The other end of the bore is sealed by a cap 29 which is likewise secured to body 12 by screws 28.

Slidably mounted within the cylinder 26 is a piston 30 having circumferential recesses 31 which serve to retain sealing rings 32 which have wiping engagement with the wall of cylinder 26. The piston 30 is partially recessed substantially along its axial plane, as at 33, to form a semi-cylindrical extension 34 which is provided with a plurality of parallel angularly disposed grooves 35 which are parallel to the grooves 25 in clamping bar 16. The grooves 35 define tongues 36 on the extension 34, which are adapted to be slidably receivable in the grooves 25. The grooves 25 define tongues 37 on extension 24, which are slidably receivable in the grooves 35.

The piston 30 is additionally relieved or recessed as at 38 to provide a clearance area for a purpose to be hereinafter described.

Figure 8:
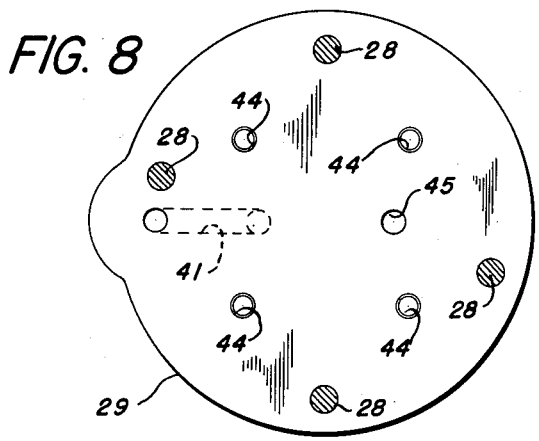
Fig. 8 is a detail of the inner face of the cylinder head as taken on line 8—8 of Fig. 1.

A channel 39, which is coextensive with and parallel to cylinder 26, is provided in the body 12. As seen in Fig. 1, the cap 27 is provided with a recessed port 40 which is in registry with the end of channel 39 and which communicates with cylinder 26. Cap 29, which is shown in Fig. 8, has a port 41 which is offset so that one end thereof is in registry with the end of channel 39 and the other end thereof is in registry with a port 56 of a control valve 42 which is secured to the cap 29 by means of screws 43 which threadedly engage tapped openings 44 in the cap. Cap 29 is also provided with an opening 45 which communicates with cylinder 26 and also is in registry with a port 57 of valve 42.

The valve 42 is similar to the valve described in my copending application referred to above. It has a central bore 46 in which is slidably mounted a cylindrical valve stem 47 having portions 48 of reduced diameter which define an annular passageway 49 within the bore 46. Adjacent the portions 48 are the bearing portions 50, 51, 52 and 53.

The valve has an air inlet opening 54 which communicates with bore 46 and is adapted to be connected to a source of compressed air.

The valve has four parallel horizontally extending passageways or ports 55, 56, 57 and 58, which extend from the mounting face 59 of the valve to the bore 46. The port 55 communicates with a vertical threaded channel 60; the port 58 communicates with a vertical threaded channel 61; and both channels 60 and 61 have a common outlet passageway 62.

Thumb screws 63 threadedly engage channels 60 and 61 and serve to control or limit the flow of air through ports 55 and 58.

A pin 64 is threadedly secured to the valve body and projects into bore 46 intermediate the stem portions 52 and 53 and thus serves to limit the longitudinal movement of the stem 47.

A wick feed oiler 65 is mounted on the valve 42 to supply lubricant to the device.

Figure 6:
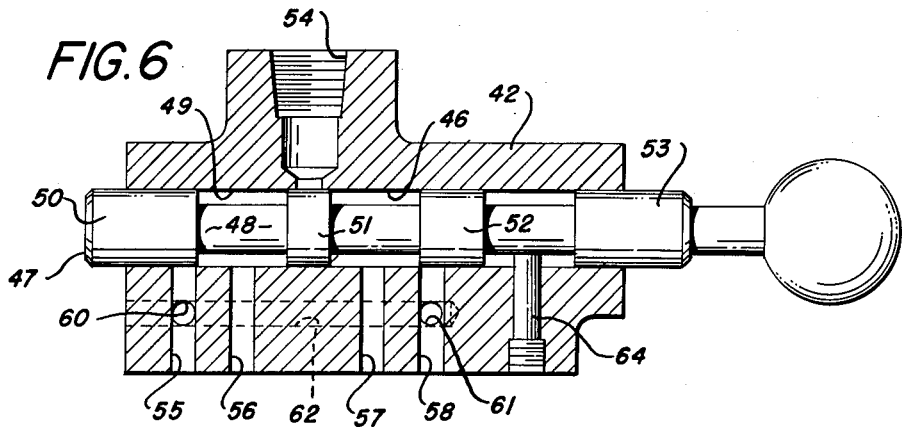
Fig. 6 is a longitudinal cross-sectional view of the air control valve taken on line 6—6 of Fig. 2.
Figure 7:
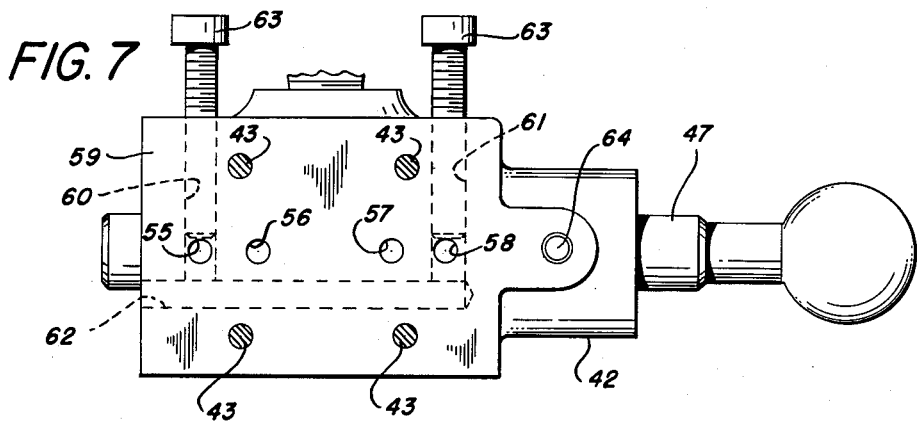
Fig. 7 is another view of the valve taken as indicated by line 7—7 of Fig. 1.

The operation of the device is as follows:

With the valve stem 47 of valve 42 in the position shown in Fig. 6, the valve is closed, as compressed air is prevented from entering bore 46 because air inlet 54 is blocked by the portion 51 of stem 47.

If valve stem 47 is moved to the left (in Fig. 6), air flows into bore 46 between bearing portions 51 and 52, and through port 57 and port 45 into cylinder 26. This causes piston 30 to be moved to the left (in Fig. 3) until it comes to rest on a cushioning washer 66 which is secured to caps 27 and 29 by means of a screw 67. The position of the piston is shown in Figs. 3 and 4.

It will be noted that as the piston 30 moves toward cap 27, the tongues 36 on extension 34 mesh with the grooves 25 on extension 24 and act against the tongues 37 to cam cylinder bar 16 upwardly in bore 17. The clamping block 15 thereby clamps a workpiece against the top plate P.

During the movement of piston 30, the residuary air in bore 26 is exhausted through port 40 in cap 27, through channel 39, port 41 in cap 29, port 56 in valve 42, port 55, channel 60, and passageway 62. The rapidity with which the air is permitted to exhaust is regulated by the thumb screw 63, and thus controls the rapidity of the upward movement of clamping bar 16.

To retract the clamping bar 16, the valve stem 47 is moved to the right (in Fig. 6). This causes compressed air to flow into port 56 of valve 42, through port 41 in cap 29, into channel 39 and through port 40 in cap 27 into cylinder 26. The piston is then caused to move to the right (in Fig. 3) and cams the clamping bar 16 downwardly. The recessed portion 38 provides a clearance which permits a full stroke of the piston 30 without any jamming of the tongue and groove connection.

The residual air in cylinder 26 is exhausted through opening 45 in cap 29, through port 57 in valve 42, through port 58, channel 61 and passageway 62. The rate of exhaust is regulated by thumb screw 63 in channel 61. Thus, by selective regulation of thumb screws 63, the device can be operated as quick clamp-quick release, quick clamp-slow release, slow clamp-quick release, or slow clamp-slow release.

It is to be noted that when the clamping bar 16 is retracted, the reaction is accomplished solely by the camming action of piston 30. However, when the clamping bar 16 is elevated, the camming action of piston 30 is supplemented by the air pressure in cylinder 26 which not only actuates piston 30 but also acts upon the clamping bar 16 to urge it upwardly. The spaced rings 22 on the bar 16 thus have a function in sealing the bore 17 against the escape of air during the elevation of the clamping bar.

In addition to functioning as sealing rings, the rings 22 also serve to distribute the atomized lubricant, supplied through valve 42, over the wall of bore 17. By reference to Fig. 4, it will be seen that the rings 22 almost reach the top end of embossment 18 when the bar 16 is elevated. Thus substantially complete lubricant distribution is assured. Furthermore, the rings 22 also act as dust rings to prevent the entrance of foreign particles into the bore 17.

Figure 9:
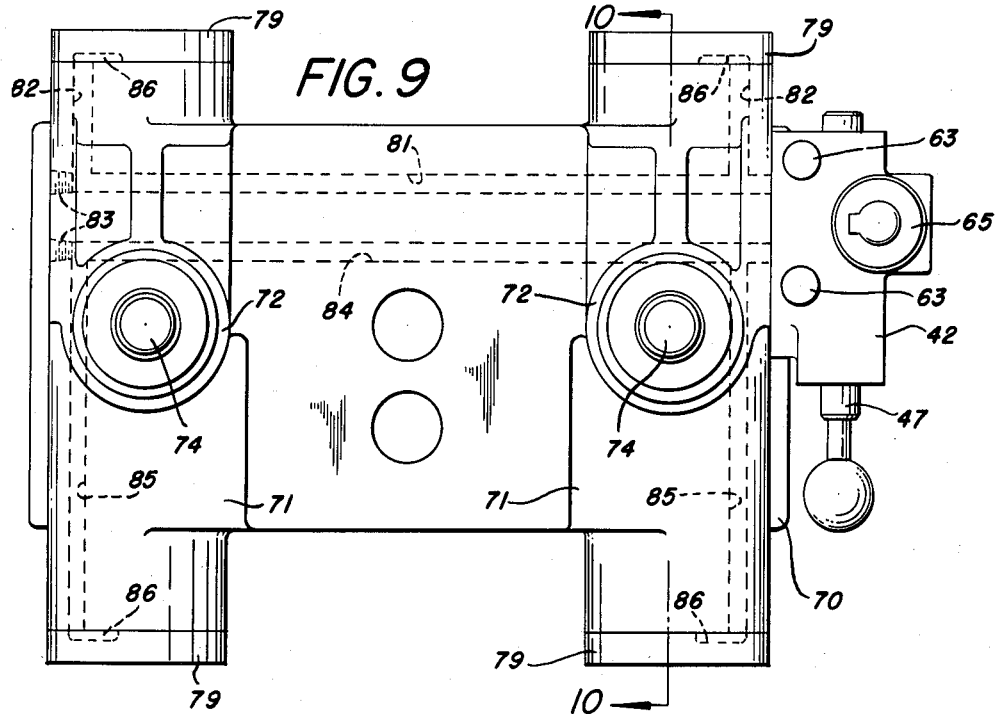
Fig. 9 is a top plan view of a modified form of clamping device.
Figure 10:
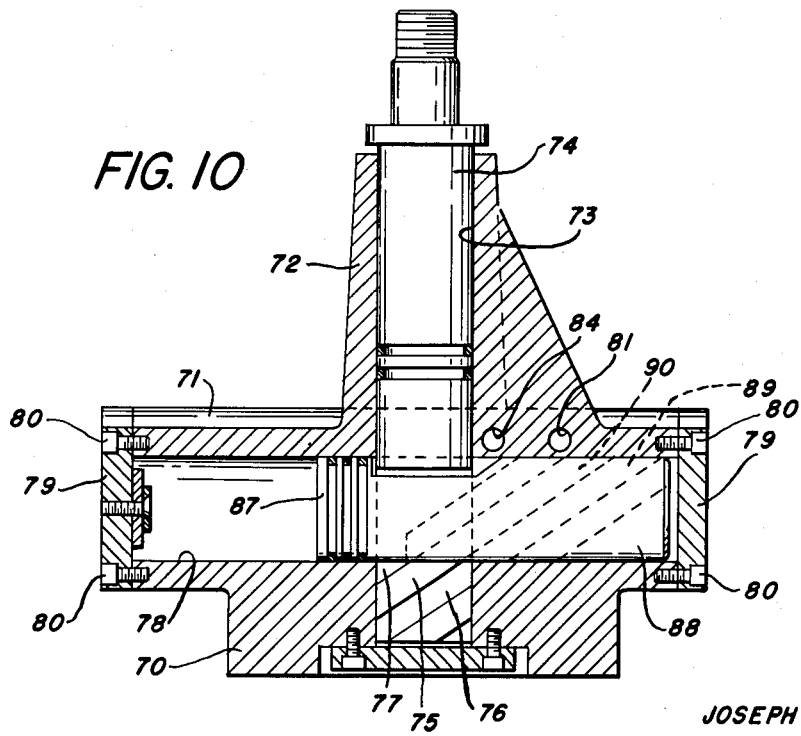
Fig. 10 is a cross-sectional view of one of the elevating mechanisms taken on line 10—10 of Fig. 9.
Figure 11:
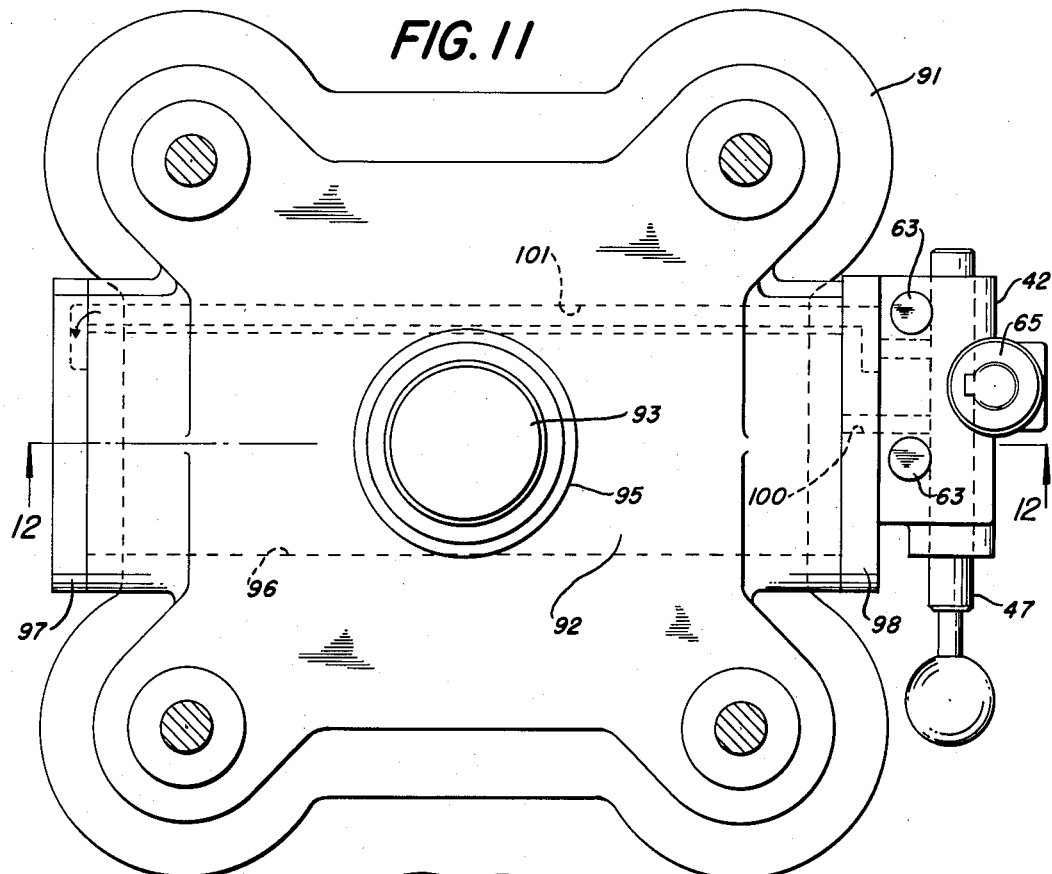
Fig. 11 is a top plan view of still another form of clamping device.

In Figs. 9 and 10 is shown a modified form of the invention in which dual pistons and two clamping bars are employed.

In this form of the invention, the device consists of a base 70 surmounted by spaced parallel cylinder bodies 71.

A boss 72, which has a vertically extending bore 73, extends upwardly from each cylinder body 71 and has slidably mounted therein, a clamping bar 74. The clamping bar 74 has angularly extending parallel grooves 76 and tongues 75 formed in an extension 77 thereof, as previously described with reference to clamping bar 16.

The cylinder bodies 71 have longitudinal bores or cylinders 78, which extend completely through the body. The open ends of the cylinders 78 are closed by means of caps 79 which are secured to the cylinder body by means of screws 80.

A horizontally extending channel 81, having branches 82, extends through the device and is sealed by a plug 83 at one end thereof. A second channel 84, having branches 85, also extends through the device and is sealed by a plug 83 at one end thereof. The channel 81 and branches 82 communicate with one end of the dual cylinders 78 through a recessed port 86 in the cap 79. The channel 84 and branches 85 communicate with the other end of cylinders 78.

A piston 87 is slidably mounted in each of the cylinders 78. Each piston 87 has an extension 88 which has angularly extending grooves 90 and tongues 89 which mesh with the grooves 76 and tongues 75 on the clamping bar 74.

The channel 81 is in registry with port 56 of control valve 42 which is mounted on the side of the device. Channel 83 communicates with port 57 of valve 42.

The operation of this form of the device is similar to that previously described.

Through port 56 of valve 42 compressed air passes into channel 81 and its branches 82 and thus through port 86 into cylinders 78 and causes movement of pistons 87 to the left (in Fig. 10) causing clamping bars 74 to be elevated.

If the compressed air enters through port 57 of valve 42, the air reaches cylinders 78 through channel 84 and its branches 85. This causes movement of pistons 87 in the opposite direction and retracts clamping bar 74 to the position shown in Fig. 10.

Thus, the clamping bars 74 are cammed into either a clamping or retracted position by means of the interengagement of the tongues 89 and grooves 90 of piston extension 88 with the tongues 75 and grooves 76 of clamping bar extension 77.

In Figs. 11-14, I have shown still another form of clamping device embodying the features of my invention.

In this form of the invention, the device includes a base 91 having integrated therewith a cylinder block or body 92. Projecting vertically centrally of the block 92 is a cylindrical clamping bar 93 which is slidably movable in the vertical bore 94 of an embossment 95 which is formed on the cylinder block.

Figure 12:
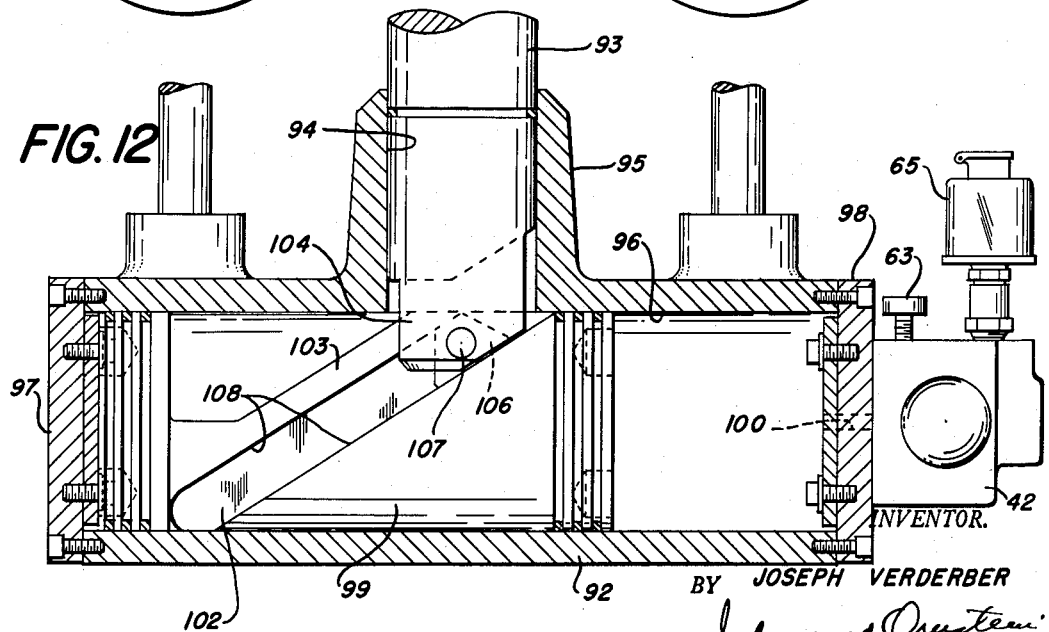
Fig. 12 is a cross-sectional view taken on line 12—12 of Fig. 11.
Figure 13:
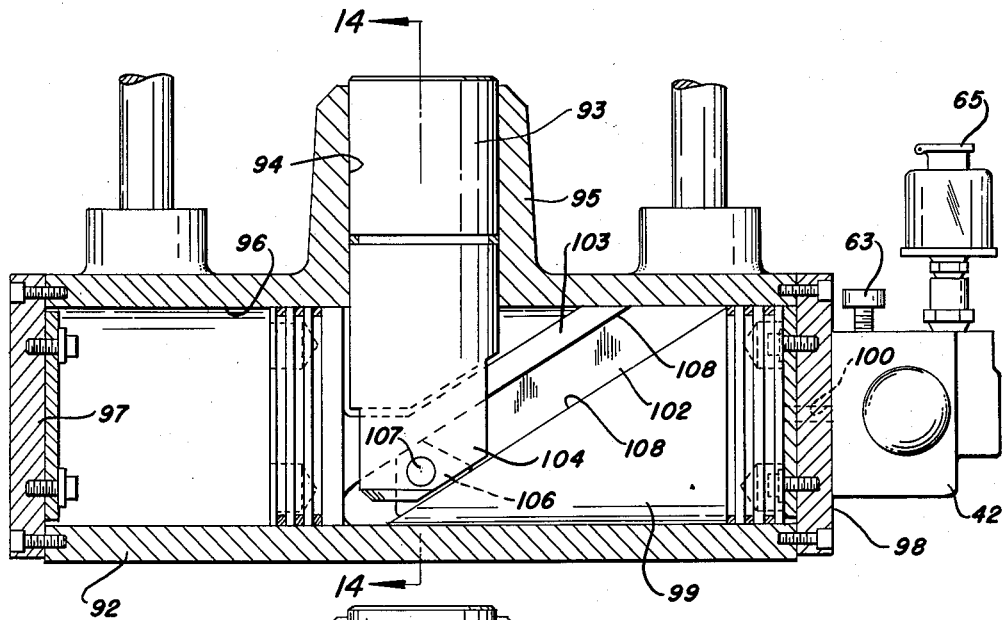
Fig. 13 is a cross-sectional view similar to Fig. 12, but showing the clamping bar in retracted position.
Figure 14:
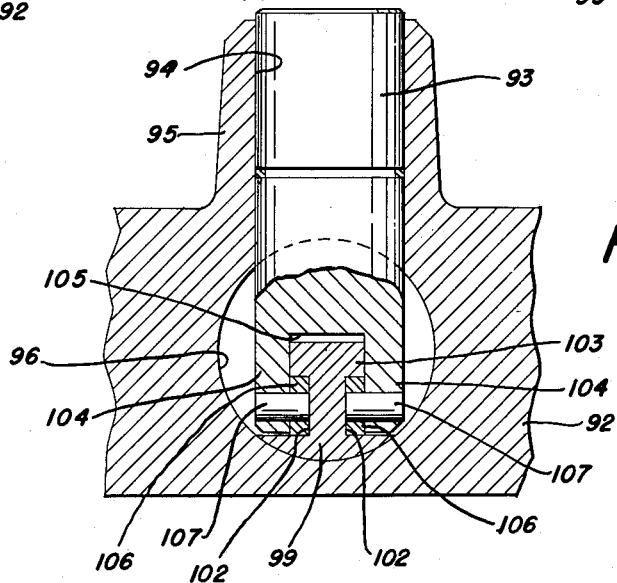
Fig. 14 is a fragmentary cross-sectional view taken on line 14—14 of Fig. 13.

As best seen in Figs. 12, 13 and 14, the lower end of the clamping bar extends into and intersects a horizontal bore 96 which extends through the cylinder block 92 and is closed on one end by a cap 97 and on the other end by a cap 98. The cap 97 corresponds to cap 27 and the cap 98 corresponds to cap 29 shown in Fig. 1.

A piston 99 is slidably mounted within the cylinder 96 for movement in one direction or the other. A channel 100 which leads from valve 42 into the right end of bore 96 (as viewed in Fig. 12) serves to conduct fluid, such as compressed air, into the cylinder and causes piston 99 to move to the left.

Another channel 101 leads from valve 42 to the other side of piston 99 and compressed air entering through this channel causes movement of piston 99 to the right. This position of the piston is shown in Fig. 13.

A portion of piston 99 is machined or provided with angularly extending parallel recesses 102 to form a T-shaped tenon 103 which extends angularly along the piston 99. The lower end of the clamping bar 93 is bifurcated to form arms 104 and a recess 105. The tenon 103 is received in the recess 105.

A pair of flat bushings 106 is secured by pins 107 to the arms 104 so as to underlie the head of T-shaped tenon 103 and thus maintain the tenon in interlocked engagement with the clamping bar 93.

When the valve stem 47 is manipulated to permit compressed air to flow through channel 100 into cylinder 96, the piston 99 is caused to move toward cap 97. The inclined surfaces 108 on piston 99 act upon the bushings 106 to cam the clamping bar 93 into elevated position against any suitable work-piece. This is shown in Fig. 12.

When the valve 42 is manipulated to cause air to flow through channel 101 into cylinder 96, the piston 99 is caused to move to the position shown in Fig. 13, causing the clamping bar 93 to be retracted.

The operation of the valve 42 is as heretofore described.

Thus I have provided a clamping device which combines the versatility of pneumatic actuation with the rigidity of a mechanical clamping action and requires no separate pneumatic circuit solely for retraction of the clamping bar.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a clamping device, the combination of a body, a horizontal cylinder within said body, a piston slidably contained within said cylinder, angularly extending tongues and grooves associated with said piston, a vertical cylinder in said body, a vertically movable clamping bar slidably contained in said vertical cylinder and forming a fluid motor means therewith at right angles to said piston, angularly extending tongues and grooves provided on said clamping bar and slidably interlocked with said first-named tongues and grooves on said piston in camming relationship thereto, a port communicating with one end of said horizontal cylinder, a second port communicating with the opposite end of said horizontal cylinder, an elevated plate rigidly supported by said body in the path of movement of said clamping bar, control means for selectively directing fluid under pressure into one or the other of said ports, whereby said piston is displaced and said clamping bar is moved vertically in response thereto, and a passageway between said cylinders for directing fluid under pressure into said vertical cylinder from one of said ports.

2. In a clamping device, the combination of a first cylinder, a first piston slidably mounted in said cylinder, a cam surface associated with said piston and linearly movable therewith, a second cylinder intersecting said first cylinder and in fluid communication with one end thereof, a second piston mounted in said second cylinder and slidably connected to said cam surface for cam-induced linear movement in response to movement of said first piston and control means for selectively directing fluid under pressure to either side of said first piston.

3. In a clamping device, the combination of a first pressure cylinder, a piston slidably contained within said cylinder, a second pressure cylinder intersecting said first cylinder and in fluid communication with one end thereof, a clamping bar slidably mounted in said second cylinder and forming a fluid motor means therewith, force-compounding means slidably connecting said clamping bar to said piston for movement in response to displacement of said piston in one direction or the other, and control means for selectively directing fluid under pressure to either end of said first cylinder.

4. In a clamping device, the combination of a first pressure cylinder, a piston slidably contained within said cylinder, a second pressure cylinder disposed angularly relatively to said first cylinder, a clamping bar slidably mounted in said second cylinder and forming a fluid motor means therewith, camming means interconnecting said piston and said clamping bar for concurrent movement, control means for selectively directing fluid under pressure to either side of said piston, and a passageway between said cylinders communicating with only one side of said piston for directing fluid under pressure to said second cylinder.

References Cited in the file of this patent

UNITED STATES PATENTS

| | | |
|---|---|---|
| 465,536 | Robinson | Dec. 22, 1891 |
| 1,045,315 | Mott | Nov. 26, 1912 |
| 1,220,424 | Janney | Mar. 27, 1917 |
| 1,332,648 | Turner | Mar. 2, 1920 |
| 1,515,173 | Roucka | Nov. 11, 1924 |
| 2,261,829 | Cross | Nov. 4, 1941 |
| 2,339,592 | Wenander | Jan. 18, 1944 |
| 2,404,529 | Reichelt | July 23, 1946 |
| 2,437,115 | Muller et al. | Mar. 2, 1948 |
| 2,573,333 | Hillix | Oct. 30, 1951 |

FOREIGN PATENTS

| | | |
|---|---|---|
| 814,097 | Germany | Sept. 20, 1951 |